J. G. LEHDE.
PLANTING MACHINE.
APPLICATION FILED JULY 14, 1914.
1,248,351. Patented Nov. 27, 1917.
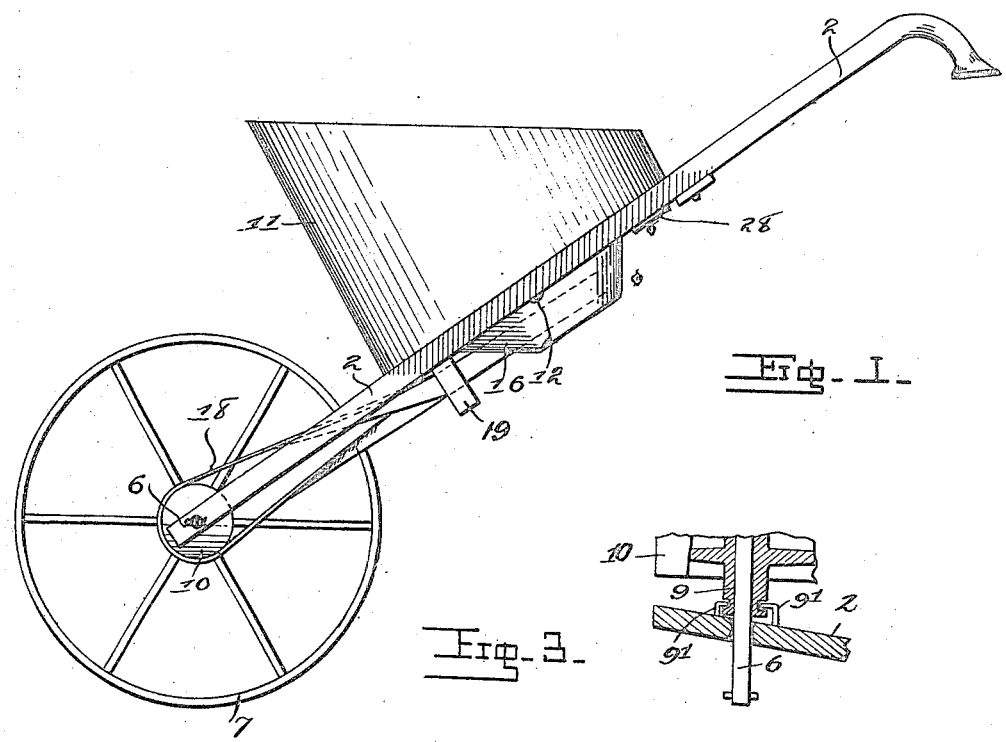
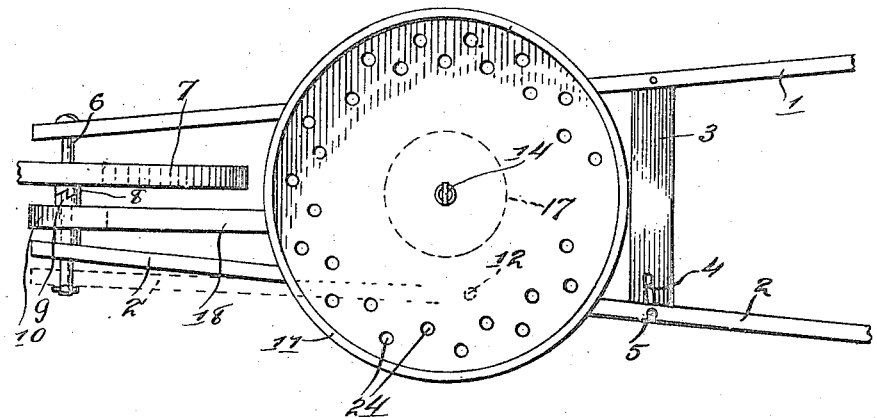
Witnesses
Edw. S. Hall.
W. Falk Jr.
Inventor
John G. Lehde.
By Richard B. Owen.
Attorney

UNITED STATES PATENT OFFICE.

JOHN G. LEHDE, OF GARDENVILLE, NEW YORK.

PLANTING-MACHINE.

1,248,351. Specification of Letters Patent. Patented Nov. 27, 1917.

Application filed July 14, 1914. Serial No. 850,978.

*To all whom it may concern:*

Be it known that I, JOHN G. LEHDE, citizen of the United States, residing at Gardenville, in the county of Erie and State of New York, have invented certain new and useful Improvements in Planting-Machines, of which the following is a specification.

My invention relates to an improved planting device or machine.

An object of the invention is to provide improvements in clamping and other wheel supported agricultural machines for driving the mechanism thereof from the supporting wheel, and particularly for controlling the application of power by means of movable handle bars.

The above and additional objects are accomplished by such means as are illustrated in their preferred embodiment in the accompanying drawings, described in the following specification and then more particularly pointed out in the claims which are appended hereto and form a part of this application.

In describing my invention in detail reference will be had to the accompanying drawings wherein like characters denote like or corresponding parts throughout the several views, and in which:—

Figure 1 is a side elevation of the machine complete;

Fig. 2 is a top plan view of the machine, parts being broken away;

Fig. 3 is a detail view illustrating the connection between the frame bars of the machine and the clutch mechanism.

Before proceeding with the description of the drawings, I desire to call particular attention to the fact that while I have evolved my invention with reference to its application as an onion sprout planter, the same may be readily utilized as a planting machine for dropping seeds, irrespective of the nature of the plants resulting therefrom.

Referring now to the drawings by numerals, 1 and 2 designate respectively the longitudinal frame sides, the same being connected adjacent one end as indicated at 3, the sides 1 and 2 converging from the rear end to the forward end of the machine, one of the said sides, 2, being loosely connected to the beam 3 whereby to provide for lateral movement of the said side. Beam 3 is provided with an arcuate slot 4 within which a pin 5 of the side 2 operates, the slot terminals limiting the lateral movement of the said side. The converged end of the respective sides 1 and 2 serve as bearings for a shaft 6 upon which the wheel 7 of the machine is mounted, one of the lateral faces of the hub 8 of the wheel being provided with teeth adapted for engagement with teeth formed in the hub 9 of a pulley 10, the latter being loosely mounted on said shaft 6 and provided with an annular groove in which pins 9' secured to the side 2 are seated, so that the hub 9 may be slid longitudinally of the said shaft through movement of the side, this arrangement providing for disengagement of the hub 9 and the hub 8 thus permitting, if desired, for movement of the entire machine forwardly without operating or driving the pulley 10.

Mounted on the sides 1 and 2 of the frame is a hopper or receptacle 11 into which the seeds or sprouts to be planted are placed. Side 2 of the frame is fulcrumed to the base plate or bottom of the hopper as indicated at 12, the said side at the same time serving as a support therefor. Within hopper 11 and resting upon the base plate or bottom thereof is a revolving disk or plate, the periphery of which is adapted for frictional engagement with the inner wall of the hopper, the said plate being loosely mounted on a shaft 14 journaled in bearings forming a part of a suitable housing 16 through which the said shaft extends. A pulley 17 is mounted on shaft 14 within the housing 16 for imparting motion thereto, the said pulley being driven through the medium of a belt 18 operating thereover and over the pulley 10 aforesaid, suitable guide rollers 19 being provided for the belt.

It will be apparent that rotation of the supporting wheels 7 will be transmitted to the pulley 17 to drive the planting mechanism or any other mechanism, and that the machine may be propelled and guided by means of the frame guides 1 and 2. The transmission of power may furthermore be controlled by moving said frame sides relatively by means of hand grips formed thereon, whereby the clutch members 8 and 9 will be engaged or disengaged.

Having thus fully described my invention, what I claim as new and desire to secure by Letters Patent, is:—

1. The combination with the seed dropping mechanism of a planting machine, of a supporting frame for said mechanism comprising frame sections terminating in hand grips, one of the said sections being pivoted for movement relative to the other at a point adjacent said grips, an axle mounted in the frame sections at a point remote from the grips, a supporting wheel on the axle, a clutch member on the wheel, a second clutch member on the shaft for engagement with the first clutch member, said second clutch member being connected for movement with one of the frame sections, a pulley on said second clutch member, and a belt around said pulley for driving the seed dropping mechanism whereby said clutch member may be brought into or out of engagement by movement of the movable frame section.

2. The combination with the seed dropping mechanism of a planting machine, a supporting frame for said mechanism comprising frame sections, one of said sections having pivotal connection with said mechanism, an axle mounted at the forward end of said frame, a supporting wheel mounted on said axle, said axle extending at one end beyond said frame, a sliding clutch member on said axle and connected with said pivoted frame section, a driving connection between said clutch and said planting mechanism, and a guide means for the frame sections.

In testimony whereof I affix my signature in presence of two witnesses.

JOHN G. LEHDE.

Witnesses:
JOHN H. GALLEY,
HENRY J. BENDER.